US008495392B1

(12) United States Patent
Bardale

(10) Patent No.: US 8,495,392 B1
(45) Date of Patent: Jul. 23, 2013

(54) SYSTEMS AND METHODS FOR SECURELY DEDUPLICATING DATA OWNED BY MULTIPLE ENTITIES

(75) Inventor: Trimbak Bardale, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 305 days.

(21) Appl. No.: 12/874,640

(22) Filed: Sep. 2, 2010

(51) Int. Cl.
- G06F 11/30 (2006.01)
- G06F 12/14 (2006.01)
- G06F 21/00 (2006.01)
- G06F 13/00 (2006.01)
- G06F 13/28 (2006.01)

(52) U.S. Cl.
USPC ........... 713/193; 713/153; 713/189; 713/168; 711/136; 711/133; 711/118; 711/117; 711/162

(58) Field of Classification Search
USPC .................. 713/153, 168, 189, 193; 711/136, 711/133, 118, 117, 161, 162
See application file for complete search history.

(56) References Cited

U.S. PATENT DOCUMENTS

| | | | |
|---|---|---|---|
| 5,901,228 A * | 5/1999 | Crawford | 705/34 |
| 6,370,247 B1 | 4/2002 | Takaragi et al. | |
| 7,266,689 B2 | 9/2007 | Douceur et al. | |
| 7,769,971 B2 * | 8/2010 | Cremelie et al. | 711/162 |
| 7,953,833 B2 * | 5/2011 | Ben-Shaul et al. | 709/222 |
| 8,190,835 B1 * | 5/2012 | Yueh | 711/162 |
| 8,219,524 B2 * | 7/2012 | Gokhale | 707/610 |
| 8,281,143 B1 * | 10/2012 | Clifford et al. | 713/179 |
| 8,401,185 B1 * | 3/2013 | Telang | 380/44 |
| 2003/0051129 A1 * | 3/2003 | Razdan et al. | 713/151 |
| 2004/0255140 A1 * | 12/2004 | Margolus et al. | 713/193 |
| 2008/0108426 A1 * | 5/2008 | Nguyen et al. | 463/25 |
| 2008/0133835 A1 * | 6/2008 | Zhu et al. | 711/118 |
| 2009/0307490 A1 | 12/2009 | Dancer | |
| 2009/0319772 A1 * | 12/2009 | Singh et al. | 713/153 |
| 2010/0114833 A1 * | 5/2010 | Mu | 707/650 |
| 2010/0332454 A1 | 12/2010 | Prahlad et al. | |
| 2011/0055559 A1 * | 3/2011 | Li et al. | 713/165 |
| 2011/0154033 A1 * | 6/2011 | Nakagoe et al. | 713/168 |
| 2011/0167221 A1 * | 7/2011 | Pangal et al. | 711/117 |
| 2012/0204024 A1 * | 8/2012 | Augenstein et al. | 713/150 |

OTHER PUBLICATIONS

Nilesh Telang; Systems and Methods for Securely Deduplicating Data Owned by Multiple Entities; U.S. Appl. No. 12/697,705, filed Feb. 1, 2010.

Enterprise 2.0 Journal; http://security-basics.blogspot.com, as accessed on May 30, 2009.

* cited by examiner

*Primary Examiner* — Yin-Chen Shaw
*Assistant Examiner* — Kari Schmidt
(74) *Attorney, Agent, or Firm* — ALG Intellectual Property, LLC

(57) ABSTRACT

A computer-implemented method for securely deduplicating data owned by multiple entities may include 1) identifying a first data segment to store on a third-party storage system, 2) identifying a client-specific database for fingerprints of deduplicated data segments stored on the third-party storage system, 3) identifying a third-party database for fingerprints of deduplicated data segments stored on the third-party storage system, 4) generating a fingerprint based on the first data segment, 5) determining that the fingerprint is not identified in the client-specific fingerprint database, 6) determining that the fingerprint is not identified in the third-party fingerprint database, 7) encrypting the first data segment with a third-party public encryption key, and then 8) transmitting the encrypted first data segment to the third-party storage system. Various other methods, systems, and computer-readable media are also disclosed.

20 Claims, 9 Drawing Sheets

SYSTEMS AND METHODS FOR SECURELY DEDUPLICATING DATA OWNED BY MULTIPLE ENTITIES

BACKGROUND

Organizations and consumers increasingly use third-party services to store data. Third-party storage services may provide a number of benefits to customers, including flexibility, low capitalization requirements, off-site backups, and centralized access to data.

In order to maximize the efficiency of their storage systems, third-party storage vendors may attempt to deduplicate the data received from their customers. For example, if two customers each wish to store a copy of the same block of data, a third-party storage vendor may, instead of storing two copies of the data, store a single copy of the data and reference the copy twice.

Many third-party storage customers want or need to encrypt their data before submitting the same to a third-party storage vendor. For example, individual consumers may wish to encrypt data sent to third-party storage vendors due to privacy concerns. Similarly, organizations may wish to encrypt data sent to third-party storage vendors in order to ensure compliance with internal or external data-protection requirements, such as governmental laws and regulations, partnership agreements with other organizations, etc. Unfortunately, by encrypting data before submitting the same to a third-party storage system, customers may interfere with a third-party storage vendor's attempt to deduplicate the data. For example, if two customers encrypt identical blocks of data using different encryption schemes (e.g., different keys), the resulting encrypted blocks of data will differ, potentially preventing the third-party storage vendor from deduplicating the two blocks of data into a single block that is referenced twice.

In view of the above limitations, the instant disclosure identifies a need for securely encrypting and deduplicating data owned by multiple entities.

SUMMARY

As will be described in greater detail below, the instant disclosure generally relates to systems and methods for securely deduplicating data owned by multiple entities. In one example, the systems described herein may accomplish such a task by 1) identifying a first data segment to store on a third-party storage system, 2) identifying a client-specific database for fingerprints of deduplicated data segments stored on the third-party storage system, 3) identifying a third-party database for fingerprints of deduplicated data segments stored on the third-party storage system, 4) generating a fingerprint based on the first data segment, 5) determining that the fingerprint is not identified in the client-specific fingerprint database, 6) determining that the fingerprint is not identified in the third-party fingerprint database, 7) encrypting the first data segment with a third-party public encryption key, and then 8) transmitting the encrypted first data segment to the third-party storage system.

In order to determine that the fingerprint is not identified in the client-specific fingerprint database, the systems described herein may 1) encrypt the fingerprint with a client-specific encryption key and 2) query the client-specific fingerprint database with the client-specific-key encrypted fingerprint (e.g., because fingerprints stored in a fingerprint database specific to a client may be encrypted with a key corresponding to that client). Since the fingerprint was not identified in the client-specific fingerprint database, the systems described herein may also add the client-specific-key encrypted fingerprint to the client-specific fingerprint database.

Likewise, in order to determine that the fingerprint is not identified in the third-party fingerprint database, the systems described herein may 1) encrypt the fingerprint with a third-party public encryption key and 2) query the third-party fingerprint database with the third-party-key encrypted fingerprint (e.g., because fingerprints stored in a common fingerprint database on the third-party storage system may be encrypted with a public key available to all clients of the third-party storage system). Since the fingerprint was not identified in the third-party fingerprint database, the systems described herein may also add the third-party-key encrypted fingerprint to the third-party fingerprint database.

In the above case, the first data segment may have not been already present on the third-party storage system. In another case, a second data segment may already be present on the third-party storage system, but may not be among data segments already stored on the third-party storage system by a specific client. In this case, the systems described herein may 1) identify a second data segment to store on the third-party storage system, 2) generate a second fingerprint based on the second data segment, 3) determine that the second fingerprint is not identified in the client-specific fingerprint database, and 4) determine that the second fingerprint is identified in the third-party fingerprint database. In some examples, systems described herein may then increment a reference count for the second fingerprint within the third-party fingerprint database.

In another case, a third data segment may already be stored on the third-party storage system by a specific client. In this case, the systems described herein may 1) identify a third data segment to store on the third-party storage system, 2) generate a third fingerprint based on the third data segment, and 3) determine that the third fingerprint is identified in the client-specific fingerprint database. In some examples, the systems described herein may then increment a reference count for the third fingerprint within the client-specific database.

In some examples, the systems described herein may also store information about the first data segment (e.g., what file or files reference the first data segment). For example, the systems described herein may 1) identify a file that includes the first data segment, 2) identify a client-specific metadata database for associating deduplicated data segments with files, and 3) add a reference linking the file to the first data segment to the client-specific metadata database.

The systems described herein may also retrieve data segments from the third-party storage system. For example, the systems described herein may 1) identify a fourth data segment to retrieve from the third-party storage system, 2) retrieve an encrypted fingerprint of the fourth data segment from the client-specific fingerprint database, 3) decrypt the encrypted fingerprint of the fourth data segment with the client-specific encryption key, 4) identify the fingerprint of the fourth data segment within the third-party fingerprint database, and then 5) decrypt the fourth data segment using a third-party private encryption key corresponding to the third-party public encryption key. In some examples, the systems described herein may use a session key to encrypt the fourth data segment during transmission. For example, the systems described herein may 1) create a session key, 2) encrypt the fourth data segment using the session key, 3) transmitting the fourth data segment to a client system, and then 4) decrypt the fourth data segment using the session key.

As will be explained in detail below, by providing multiple clients with a public encryption key to encrypt data to be stored, and by allowing each client to encrypt information identifying ownership of data using its own encryption key, the various systems and methods described herein may enable third-party storage vendors to deduplicate data owned by multiple entities without exposing all of the data to all of the entities.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
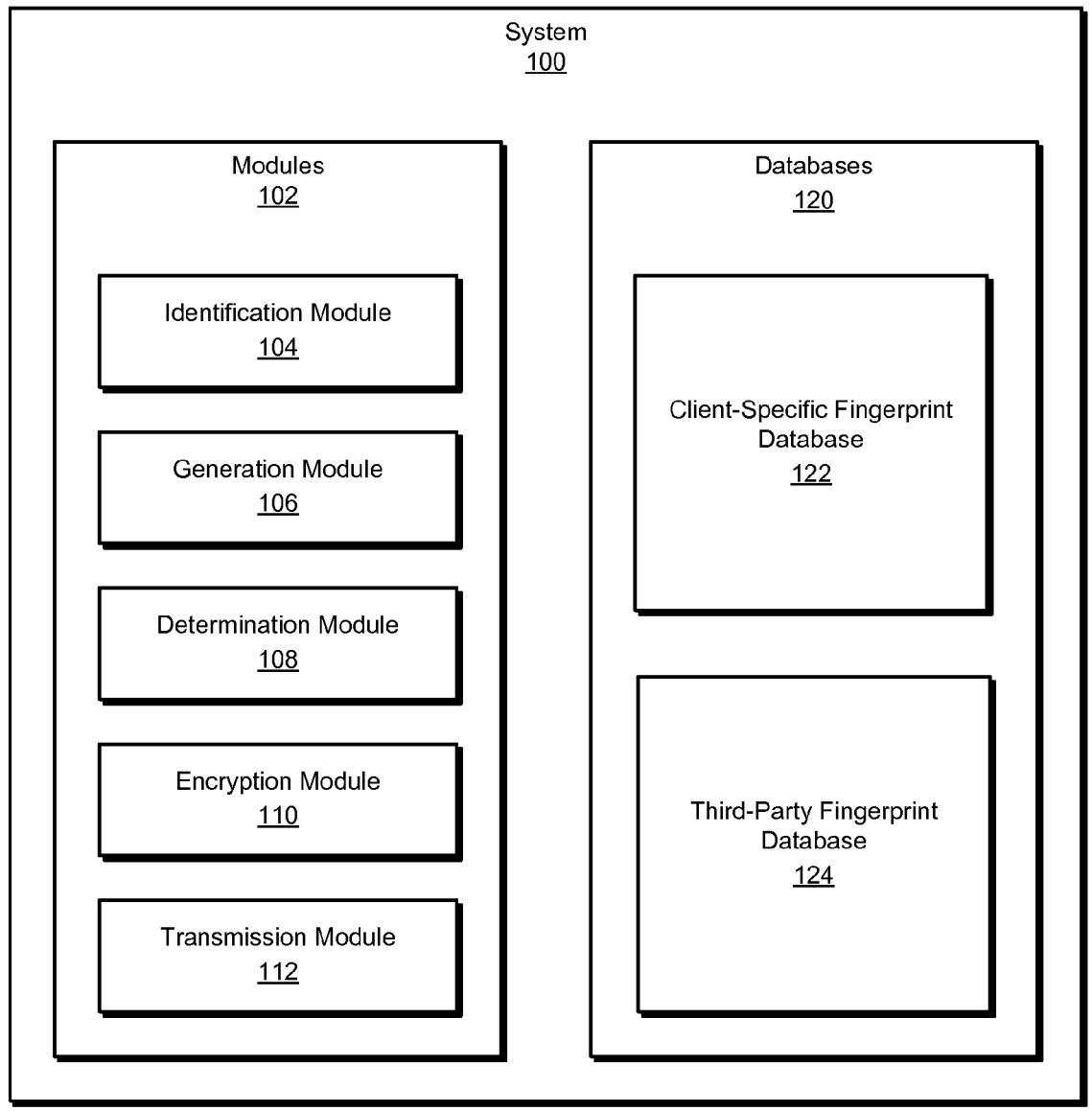
FIG. 1 is a block diagram of an exemplary system for securely deduplicating data owned by multiple entities.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
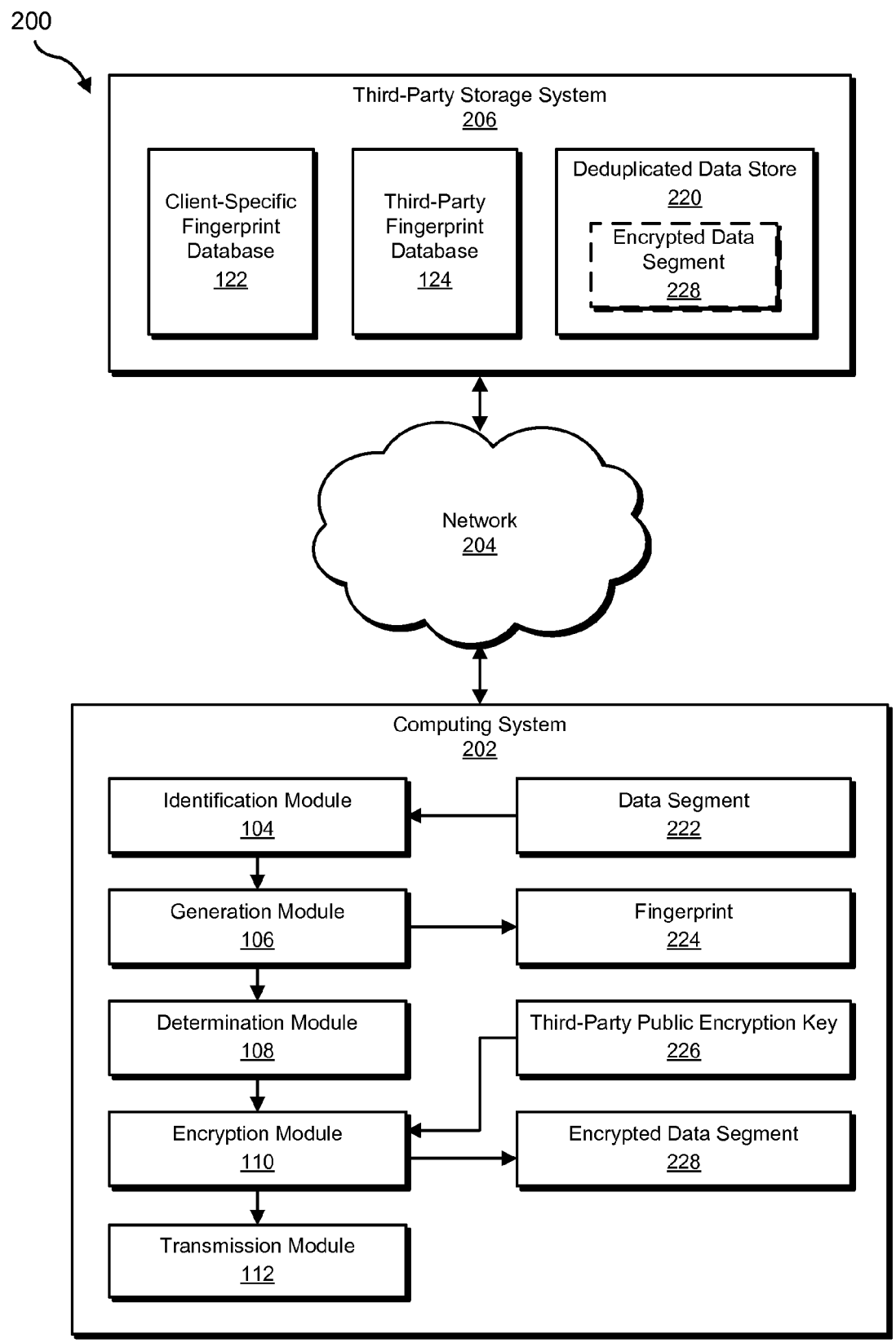
FIG. 2 is a block diagram of an exemplary system for securely deduplicating data owned by multiple entities.
Figure 3:
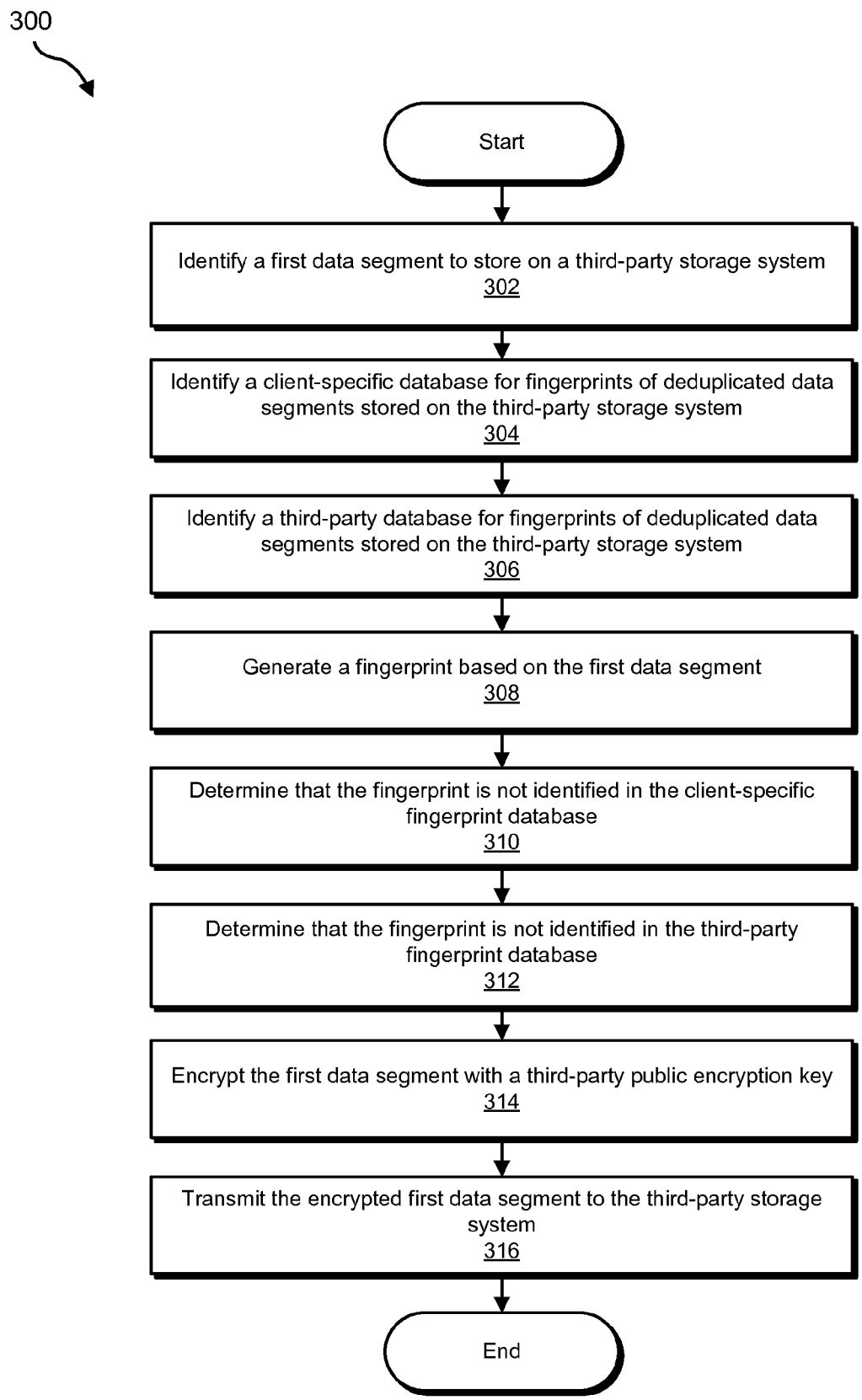
FIG. 3 is a flow diagram of an exemplary method for securely deduplicating data owned by multiple entities.
Figure 4:
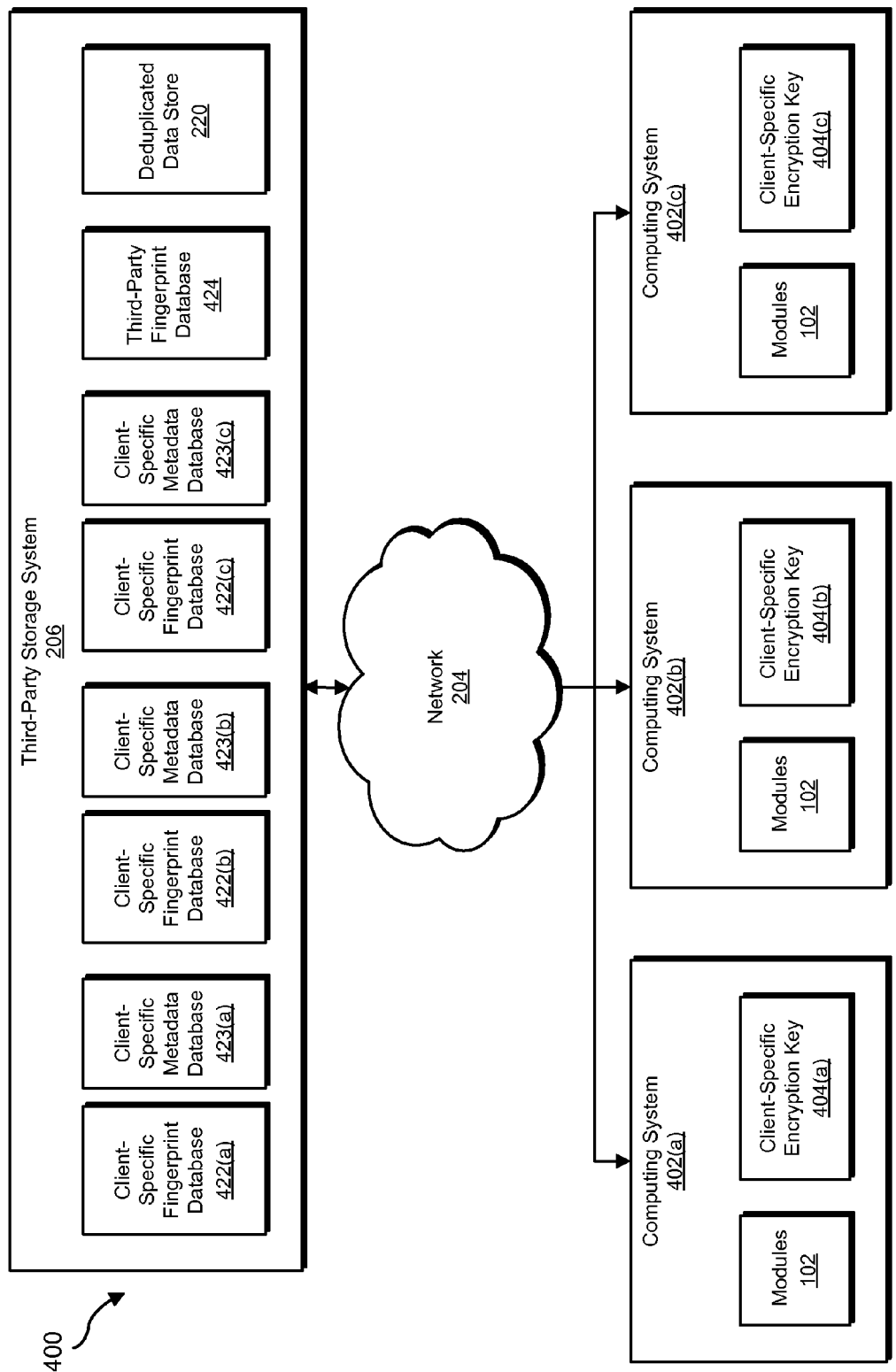
FIG. 4 is a block diagram of an exemplary system for securely deduplicating data owned by multiple entities.

The following will provide, with reference to FIGS. 1, 2, and 4, detailed descriptions of exemplary systems for securely deduplicating data owned by multiple entities. Detailed descriptions of corresponding computer-implemented methods will also be provided in connection with FIGS. 3 and 5-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for securely deduplicating data owned by multiple entities. As illustrated in this figure, exemplary system 100 may include one or more modules 102 for performing one or more tasks. For example, and as will be explained in greater detail below, exemplary system 100 may include an identification module 104 programmed to 1) identify a first data segment to store on a third-party storage system, 2) identify a client-specific database for fingerprints of deduplicated data segments stored on the third-party storage system, and 3) identify a third-party database for fingerprints of deduplicated data segments stored on the third-party storage system. Exemplary system 100 may also include a generation module 106 programmed to generate a fingerprint based on the first data segment. Exemplary system 100 may additionally include a determination module 108 programmed to 1) determine that the fingerprint is not identified in the client-specific fingerprint database and 2) determine that the fingerprint is not identified in the third-party fingerprint database.

In addition, and as will be described in greater detail below, exemplary system 100 may include an encryption module 110 programmed to encrypt the first data segment with a third-party public encryption key. Exemplary system 100 may also include a transmission module 112 programmed to transmit the encrypted first data segment to the third-party storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing system 202 and/or third-party storage system 206), computing system 810 in FIG. 8, and/or portions of exemplary network architecture 900 in FIG. 9. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a client-specific fingerprint database 122 for storing fingerprints of data segments stored on a third-party storage system and owned by a specific client. Exemplary 100 may also include a third-party fingerprint database 124 for storing fingerprints of data segments stored on the third-party storage system.

Databases 120 in FIG. 1 may represent a portion of one or more computing devices. For example, databases 120 may represent a portion of third-party storage system 206 in FIG. 2, computing system 810 in FIG. 8, and/or portions of exemplary network architecture 900 in FIG. 9. Alternatively, databases 120 in FIG. 1 may represent one or more physically separate devices capable of being accessed by a computing device, such as third-party storage device 206 in FIG. 2, computing system 810 in FIG. 8, and/or portions of exemplary network architecture 900 in FIG. 9.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a third-party storage device 206 via a network 204. In one embodiment, and as will be described in greater detail below, computing system 202 may include modules 102 from FIG. 1 (e.g., identification module 104, generation module 106, determination module 108, encryption module 110, and transmission module 112).

In one example, and as will be described in greater detail below, modules 102 may program computing system 202 to 1) identify a first data segment (e.g., a data segment 222) to store on a third-party storage system (e.g., third-party storage system 206), 2) identify a client-specific database (e.g., client-specific fingerprint database 122) for fingerprints of deduplicated data segments stored on the third-party storage system (e.g., in a deduplicated data store 220), 3) identify a third-party database for fingerprints of deduplicated data segments stored on the third-party storage system (e.g., third-party fingerprint database 124), 4) generate a fingerprint based on the first data segment (e.g., a fingerprint 224), 5) determine that the fingerprint is not identified in the client-specific fingerprint database, 6) determine that the fingerprint is not identified in the third-party fingerprint database, 7) encrypt the first data segment (e.g., generating an encrypted data segment 228) with a third-party public encryption key (e.g., a third-party public encryption key 226), and then 8) transmit the encrypted first data segment to the third-party storage system.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Third-party storage system 206 generally represents any type or form of computing device that is capable of storing and deduplicating data. Examples of third-party storage system 206 include, without limitation, application servers and database servers configured to provide various database services and/or run certain software applications, storage appliances, and/or networks of servers and/or storage appliances.

Network 204 generally represents any medium or architecture capable of facilitating communication or data transfer. Examples of network 204 include, without limitation, an intranet, a wide area network (WAN), a local area network (LAN), a personal area network (PAN), a storage area network (SAN), the Internet, power line communications (PLC), a cellular network (e.g., a GSM Network), exemplary network architecture 900 in FIG. 9, or the like. Network 204 may facilitate communication or data transfer using wireless or wired connections. In one embodiment, network 204 may facilitate communication between computing system 202 and third-party storage system 206.

FIG. 3 is a flow diagram of an exemplary computer-implemented method 300 for securely deduplicating data owned by multiple entities. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a first data segment to store on a third-party storage system. For example, at step 302 identification module 104 may, as part of computing system 202 in FIG. 2, identify data segment 222 to store on third-party storage system 206.

As used herein, the term "data segment" may refer to any unit of data. Examples of a data segment include, but are not limited to, a file, a portion of a file, a data block, a portion of a data stream, and/or a database entry.

Additionally, as used herein the term "third-party storage system" may refer to any type or form of storage system, including cloud-based storage systems, that is capable of storing and deduplicating data. In some examples, the third-party storage system may include a single-instance storage system (i.e., a storage system configured to only store a single instance of content for multiple owners). In some examples, the third-party storage system may include a system for storing backed up data and/or archived data.

In some embodiments the third-party storage system may provide storage for multiple clients. For example, FIG. 4 is an illustration of an exemplary system for securely deduplicating data owned by multiple entities. As illustrated in FIG. 4, the third-party storage system may be in communication with multiple clients (e.g., computing systems 402(a)-(c)).

Identification module 104 may identify the first data segment in step 402 in a variety of ways. In one example, identification module 104 may retrieve information from a configuration file that identifies the first data segment. Additionally or alternatively, identification module 104 may receive a message that identifies the first data segment.

In some embodiments, identification module 104 may identify one or more files to be stored on the third-party storage device and then divide the files into a set of data segments. In these embodiments, identification module 104 may identify one of the data segments in the set of data segments. For example, identification module 104 may divide a set of files into data segments of a pre-configured segment size. In some examples, identification module 104 may insert a segment break before reaching the pre-configured segment size. For example, when backing up files along with security credentials for accessing the files (using, e.g., an API such as BackupRead for MICROSOFT WINDOWS), identification module 104 may insert a segment break at the end of a file so that the security credentials will begin a new data segment.

Identification module 104 may perform step 402 in a variety of contexts. For example, identification module 104 may identify the first data segment as part of a set of data segments to store on a third-party storage system in order to move files represented by the data segments to the third-party storage system. Additionally or alternatively, identification module 104 may identify the first data segment to back up the first data segment to the third-party storage system.

Returning to FIG. 3, at step 304 one or more of the systems described herein may identify a client-specific database for fingerprints of deduplicated data segments stored on the third-party storage system. For example, at step 304 identification module 104 may, as part of computing system 202 in FIG. 2, identify client-specific fingerprint database 122.

As used herein, the term "client-specific" may refer to an attribute of a component of one or more of the systems described herein which is only accessible to, used by, and/or reserved for a designated client. Such a client may correspond to an organization, a group with shared secrets, a computing device, and/or any other suitable entity. For example, a client-specific fingerprint database may include a database of fingerprints of data segments owned by and/or submitted by a particular client. Using FIG. 4 as an example, a client-specific fingerprint database 422(a) may correspond to computing system 402(a), whereas client-specific fingerprint databases 422(b) and 422(c) may correspond to computing systems 402(b) and 402(c), respectively.

Additionally, the term "fingerprint," as used herein, may refer to any type of fingerprint, hash function output, checksum, and/or digital signature that corresponds to and/or uniquely identifies a data segment. Also, the term "deduplication," as used herein, may refer to one or more operations related to reducing the amount of storage space used in a single-instance data storage system, including operations for detecting and preventing data from being redundantly stored to the single-instance data storage system. Deduplication may be performed using any suitable deduplication technology or algorithm.

Identification module 104 may perform step 304 in any suitable manner. For example, identification module 104 may identify the client-specific fingerprint database by providing a credential (e.g., a passcode) to the third-party storage system which the third-party storage system may match with the client-specific fingerprint database. Additionally or alternatively, identification module 104 may identify the client-specific fingerprint database by receiving a message and/or reading a configuration file that identifies the client-specific fingerprint database. As will be described in greater detail below, in some examples the client-specific fingerprint database and/or its contents may be encrypted with a client-specific encryption key.

Returning to FIG. 3, at step 306 one or more of the systems described herein may identify a third-party database for fingerprints of deduplicated data segments stored on the third-party storage system. For example, at step 306 identification module 104 may, as part of computing system 202 in FIG. 2, identify third-party fingerprint database 124.

As used herein, the term "third-party" may refer to an attribute of a component of one or more of the systems described herein that is only accessible to, used by, and/or reserved for an entity responsible for storing data on behalf of other entities. For example, a third-party fingerprint database may include a database of fingerprints of data segments that is directly accessible and/or usable only to the third-party storage system.

Identification module 104 may perform step 306 in any suitable manner. For example, identification module 104 may identify the third-party fingerprint database by reading from a configuration file identifying the third-party fingerprint database. Additionally or alternatively, identification module 104 may identify the third-party fingerprint database by receiving a message identifying the third-party fingerprint database. In some examples, identification module 104 may identify the third-party fingerprint database simply by attempting to access information (either directly or indirectly) from the third-party fingerprint database.

Returning to FIG. 3, at step 308 one or more of the systems described herein may generate a fingerprint based on the first data segment. For example, at step 308 generation module 106 may, as part of computing system 202 in FIG. 2, generate fingerprint 224.

Generation module 106 may perform step 308 in any suitable manner. For example, generation module 106 may generate the fingerprint by performing a hash function using the first data segment as input. In some examples, generation module 106 may be configured to perform a particular hash function on the first data segment such that all instances of generation module 106 may produce the same fingerprint given the same data segment. Using FIG. 4 as an example, computing systems 402(a) and 402(b) may have a data segment in common (such as a data segment from a pair of identical files) to store on third-party storage system 206. In this example, generation module 106 on computing system 402(a) may use the same function to generate the fingerprint as generation module 106 on computing system 402(b). Generally, the systems described herein may use identical functions across clients for deduplication (e.g., when splitting files into data segments, when generating fingerprints, etc.).

Returning to FIG. 3, at step 310 one or more of the systems described herein may determine that the fingerprint is not identified in the client-specific fingerprint database. For example, at step 310 determination module 108 may, as part of computing system 202 in FIG. 2, determine that fingerprint 224 is not identified in client-specific fingerprint database 122.

Determination module 108 may perform step 310 in a variety of ways. For example, determination module 108 may determine that the fingerprint is not identified in the client-specific database by 1) encrypting the fingerprint with a client-specific encryption key and 2) querying the client-specific fingerprint database with the client-specific-key encrypted fingerprint. In this example, the client-specific encryption key may be available to the owner of the first data segment. Using FIG. 4 as an example, computing systems 402(a)-(c) may belong to three separate organizations. Each organization may use its own encryption key (e.g., client-specific encryption keys 404(a)-(c), respectively).

In some examples, once determination module 108 has determined that the fingerprint is not identified in the client-specific database, determination module 108 may add the fingerprint (e.g., as encrypted with the client-specific encryption key) to the client-specific fingerprint database. In this manner, and as will be described in greater detail below, the client-specific fingerprint database may yield positive responses to future queries regarding data segments identical to the first data segment, thereby facilitating deduplication efforts.

In some embodiments, instead of querying the client-specific fingerprint database, determination module 108 may determine that the fingerprint is not identified in the client-specific fingerprint database by consulting a local cache recording the results of past queries to the client-specific fingerprint database. Additionally or alternatively, determination module 108 may determine that the fingerprint is not identified in the client-specific fingerprint database by consulting one or more data structures indicating which data segments have been transmitted to the third-party storage system.

Returning to FIG. 3, at step 312 one or more of the systems described herein may determine that the fingerprint is not identified in the third-party fingerprint database. For example, at step 312 determination module 108 may, as part of computing system 202 in FIG. 2, determine that fingerprint 224 is not identified in third-party fingerprint database 124.

Determination module 108 may perform step 312 in a variety of ways. For example, determination module 108 may determine that the fingerprint is not identified in the third-party database by 1) encrypting the fingerprint with a third-party public encryption key and 2) querying the third-party fingerprint database with the third-party encrypted fingerprint. In this example, the third-party public encryption key may be publicly available (e.g., to all clients of the third-party storage system).

In some examples, once determination module 108 has determined that the fingerprint is not identified in the third-party fingerprint database, determination module 108 may add the fingerprint (e.g., as encrypted with the third-party public encryption key) to the third-party fingerprint database.

In this manner, and as will be described in greater detail below, the third-party fingerprint database may yield positive responses to future queries regarding data segments identical to the first data segment, thereby facilitating deduplication efforts.

In some embodiments, instead of querying the third-party fingerprint database, determination module 108 may determine that the fingerprint is not identified in the third-party fingerprint database by consulting a local cache recording the results of past queries to the third-party fingerprint database.

Returning to FIG. 3, at step 314 one or more of the systems described herein may encrypt the first data segment with a third-party public encryption key. For example, at step 314 encryption module 110 may, as part of computing system 202 in FIG. 2, encrypt data segment 222 with third-party public encryption key 226.

As used herein, the term "public encryption key" may refer to any key that does not require secrecy in order to secure data encrypted with the key. For example, a public encryption key may be used to encrypt data using an asymmetric key algorithm. Accordingly, decrypting data encrypted with a public encryption key may require a corresponding private key.

Encryption module 110 may encrypt the first data segment with the third-party public encryption key in any suitable manner and using any suitable encryption algorithm. In some examples, the third-party public encryption key used to encrypt the first data segment may be the same as a third-party public encryption key used to encrypt the fingerprint of the first data segment as described earlier.

At step 316, one or more of the systems described herein may transmit the encrypted first data segment to the third-party storage system. For example, at step 316 transmission module 112 may, as part of computing system 202 in FIG. 2, transmit encrypted data segment 228 to third-party storage system 206 (e.g., within deduplicated data store 220).

Transmission module 112 may perform step 316 in any suitable manner. For example, transmission module 112 may transmit the encrypted first data segment to the third-party storage system across a network. In some examples, transmission module 112 may transmit the encrypted first data segment to a deduplicated data store within the third-party storage system. After step 316, method 300 may terminate.

Figure 5:
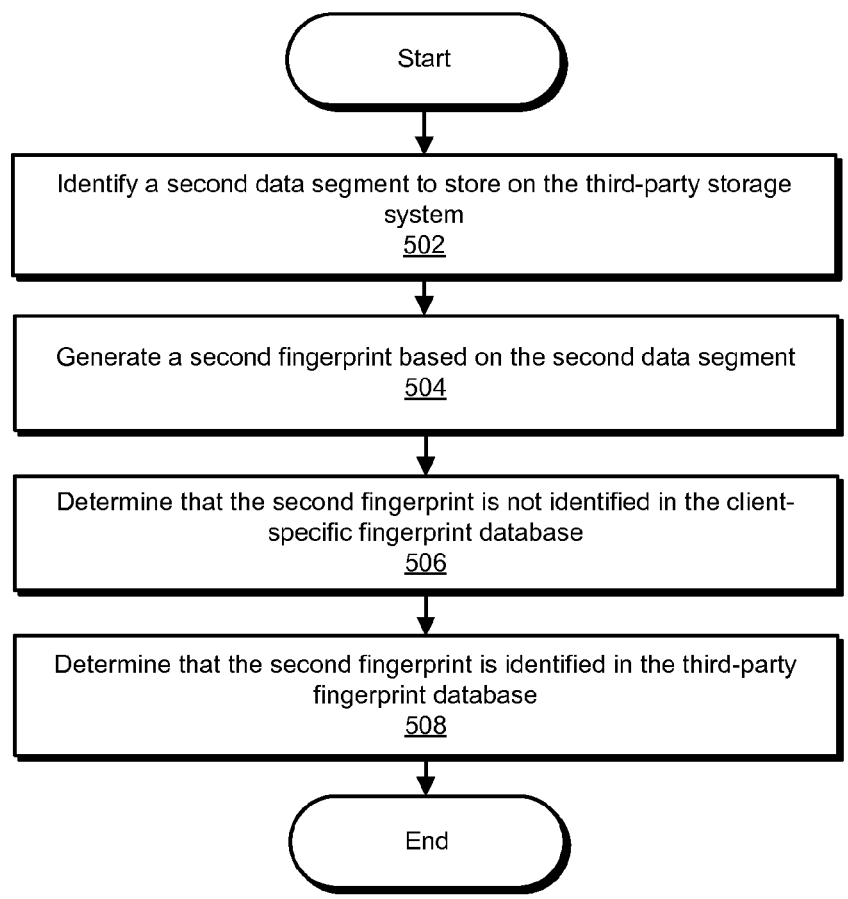
FIG. 5 is a flow diagram of an exemplary method for securely deduplicating data owned by multiple entities.

FIG. 5 is a flow diagram of an exemplary computer-implemented method 500 for securely deduplicating data owned by multiple entities. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

While the description above of method 300 in FIG. 3 may relate to a first data segment that may have not been already present on the third-party storage system, method 500 in FIG. 5 may relate to a case in which a second data segment may already be present on the third-party storage system, but may not be among data segments already stored on the third-party storage system by a specific client. In this case, the systems described herein may 1) identify a second data segment to store on the third-party storage system, 2) generate a second fingerprint based on the second data segment, 3) determine that the second fingerprint is not identified in the client-specific fingerprint database, and 4) determine that the second fingerprint is identified in the third-party fingerprint database.

For example, identification module 104 may identify the second data segment using any of the techniques described earlier with reference to identifying the first data segment (e.g., at step 302 of FIG. 3). Likewise, generation module 106 may generate the second fingerprint using any of the techniques described earlier with reference to generating the fingerprint based on the first data segment (e.g., at step 308 of FIG. 3). Determination module 108 may determine that the second fingerprint is not identified in the client-specific fingerprint database using any of the techniques described earlier with reference to determining that the fingerprint of the first data segment is not identified in the client-specific fingerprint database (e.g., at step 310 of FIG. 3).

As illustrated in FIG. 5, at step 508 one or more of the systems described herein may determine that the second fingerprint is identified in the third-party fingerprint database.

Determination module 108 may perform step 508 in a variety of ways. For example, determination module 108 may determine that the second fingerprint is identified in the third-party database by encrypting the second fingerprint with a third-party public encryption key and querying the third-party fingerprint database with the third-party encrypted second fingerprint.

Upon determining that the second fingerprint is identified in the third-party database, the systems described herein may identify a corresponding data segment stored on the third-party storage system (e.g., that is identical to the second data segment) and associate the corresponding data segment with the client that attempted to add the second data segment.

In some examples, determination module 108 may then add the second fingerprint to the client-specific fingerprint database (e.g., by first encrypting the second fingerprint with the client-specific encryption key). Determination module 108 may also increment a reference count for the second fingerprint within the third-party fingerprint database (e.g., to indicate the number of clients and/or files that reference the second data segment). After step 508, method 500 may terminate.

Figure 6:
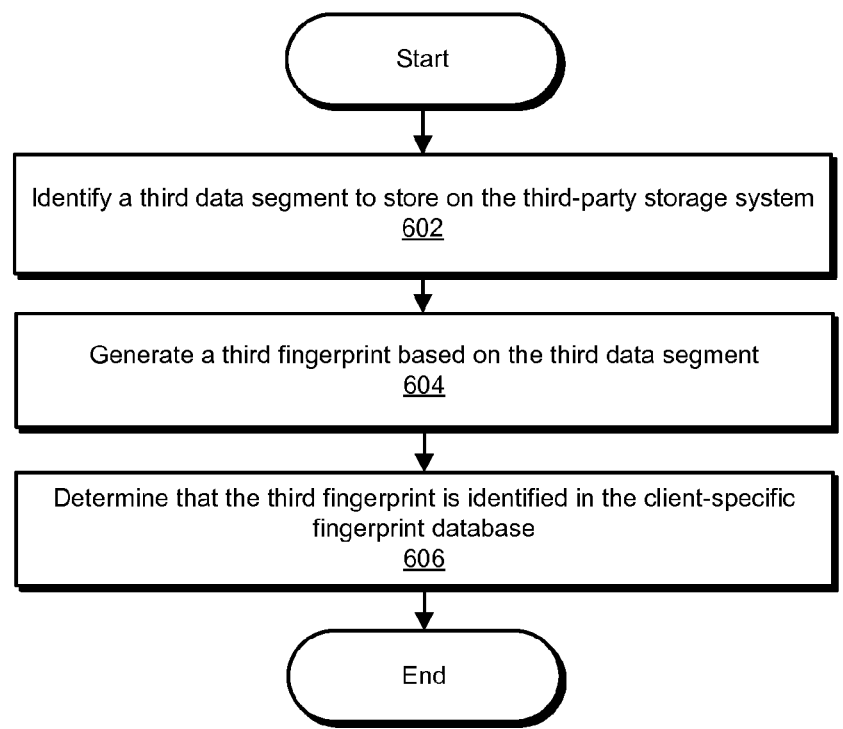
FIG. 6 is a flow diagram of an exemplary method for securely deduplicating data owned by multiple entities.

FIG. 6 is a flow diagram of an exemplary computer-implemented method 600 for securely deduplicating data owned by multiple entities. The steps shown in FIG. 6 may be performed by any suitable computer-executable code and/or computing system. In some embodiments, the steps shown in FIG. 6 may be performed by one or more of the components of system 100 in FIG. 1 and/or system 200 in FIG. 2.

While the description above of method 300 in FIG. 3 may relate to a first data segment that may have not been already present on the third-party storage system, method 600 in FIG. 6 may relate to a case in which a third data segment may already be present on the third-party storage system as well as among data segments already stored (or referenced) on the third-party storage system by a specific client. In this case, the systems described herein may 1) identify a third data segment to store on the third-party storage system, 2) generate a third fingerprint based on the third data segment, and 3) determine that the third fingerprint is identified in the client-specific fingerprint database.

For example, identification module 104 may identify the third data segment using any of the techniques described earlier with reference to identifying the first data segment (e.g., at step 302 of FIG. 3). Likewise, generation module 106 may generate the third fingerprint using any of the techniques described earlier with reference to generating the fingerprint based on the first data segment (e.g., at step 308 of FIG. 3).

As illustrated in FIG. 6, at step 606 one or more of the systems described herein may determine that the third fingerprint is identified in the client-specific fingerprint database. Determination module 108 may perform step 606 in a variety of ways. For example, determination module 108 may determine that the third fingerprint is identified in the client-specific database by encrypting the third fingerprint with the client-specific encryption key and querying the client-specific fingerprint database with the client-specific-key encrypted third fingerprint.

Upon determining that the third fingerprint is identified in the client-specific fingerprint database, the systems described herein may increment a reference count for the third fingerprint within the client-specific fingerprint database (e.g., to indicate the number of files that reference the second data segment) and/or the third-party fingerprint database. After step 606, method 600 may terminate.

In some examples, the systems described herein may also use client-specific metadata databases. For example, one or more of the systems described herein may 1) identify a file that includes the first data segment, 2) identify a client-specific metadata database for associating deduplicated data segments with files, and 3) add a reference linking the file to the first data segment to the client-specific metadata database.

Using FIG. 4 as an example, computing systems 402(a)-(c) may be associated with client-specific metadata databases 423(a)-(c), respectively. For example, if computing system 402(a) uploads a file to the third-party storage system, each data segment of the file (or a matching data segment in deduplicated data store 220) may be associated with the file in client-specific metadata database 423(a).

The reference linking the file to the first data segment may include any suitable information. For example, the reference linking the file to the first data segment may include information identifying the file and a fingerprint of the first data segment. In some examples, the client-specific metadata database may be encrypted (e.g., with the client-specific encryption key). Conversely, the client-specific metadata database may be unencrypted.

In some examples, each data segment of a file being uploaded to the third-party storage device may be added to the metadata database as the data segment arrives. In these examples, the systems described herein may achieve faster retransmission of the file in the case of an intermediate failure after sending only part of the file.

Figure 7:
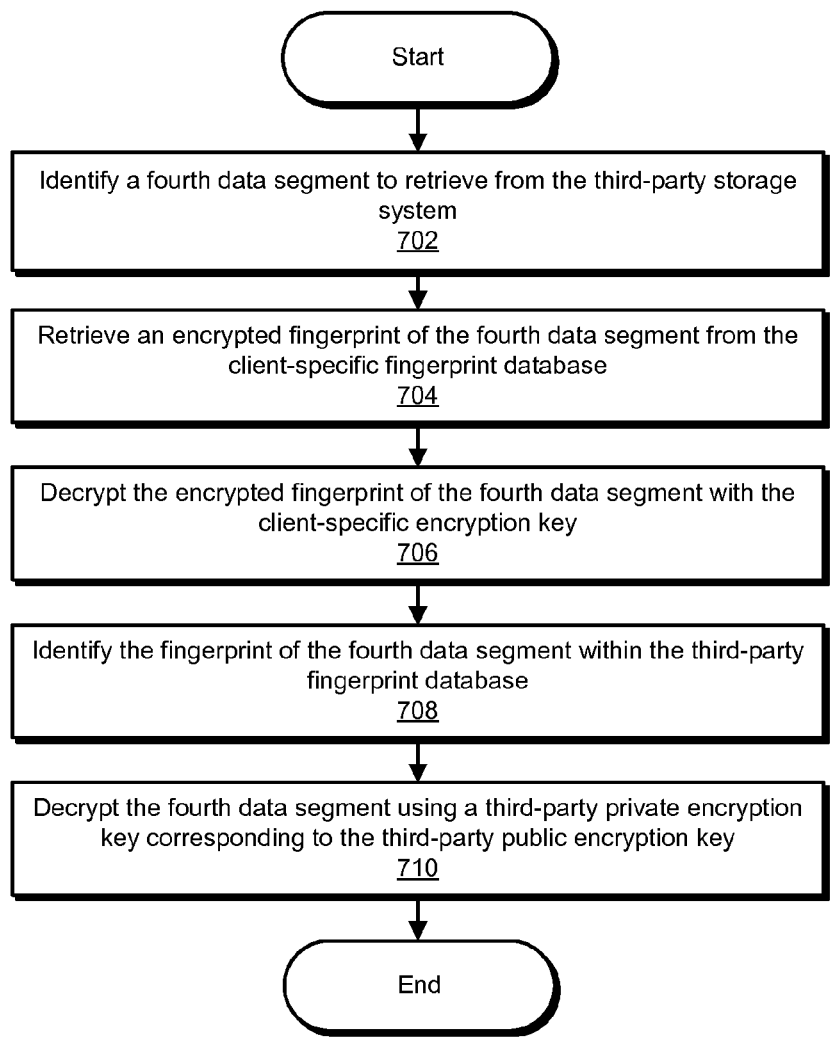
FIG. 7 is a flow diagram of an exemplary method for securely deduplicating data owned by multiple entities.

FIG. 7 is a flow diagram of an exemplary computer-implemented method 700 for securely deduplicating data owned by multiple entities. The steps shown in FIG. 7 may be performed by any suitable computer-executable code and/or computing system. In some embodiments, the steps shown in FIG. 7 may be performed by one or more of the components of system 100 in FIG. 1 and/or system 200 in FIG. 2.

By performing one or more of the steps shown in FIG. 7, the systems described herein may retrieve data segments from the third-party storage system. For example, the systems described herein may 1) identify a fourth data segment to retrieve from the third-party storage system, 2) retrieve an encrypted fingerprint of the fourth data segment from the client-specific fingerprint database, 3) decrypt the encrypted fingerprint of the fourth data segment with the client-specific encryption key, 4) identify the fingerprint of the fourth data segment within the third-party fingerprint database, and then 5) decrypt the fourth data segment using a third-party private encryption key corresponding to the third-party public encryption key.

In some examples, in addition to retrieving the encrypted fingerprint of the fourth data segment, the systems described herein may also retrieve client-specific file metadata (e.g., from a client-specific metadata database).

Identifying the fingerprint of the fourth data segment within the third-party fingerprint database may include a variety of steps. For example, the systems described herein may encrypt the fingerprint of the fourth data segment with the client-specific encryption key and query the client-specific fingerprint database with the encrypted fingerprint of the fourth data segment. In some examples, in order to avoid possible collision (e.g., due to multiple entries encrypted with different keys resulting in the same hash), the client-specific fingerprint database may return candidate fingerprints until the correct fingerprint for the fourth data segment is found.

In some examples, the systems described herein may use a session key to encrypt the fourth data segment during transmission. For example, the systems described herein may 1) create a session key, 2) encrypt the fourth data segment using the session key, and then 3) transmit the fourth data segment to a client system, which may in turn decrypt the fourth data segment using the session key. In this manner, the fourth data segment may remain secure en route to the client. As used herein, the term "session key" may refer to a single-use symmetric encryption key available to both parties of a communication.

As explained above, by providing multiple clients with a public encryption key to encrypt data to be stored, and by allowing each client to encrypt information identifying ownership of data using its own encryption key, the various systems and methods described herein enable third-party storage vendors to deduplicate data owned by multiple entities without exposing all of the data to all of the entities.

Figure 8:
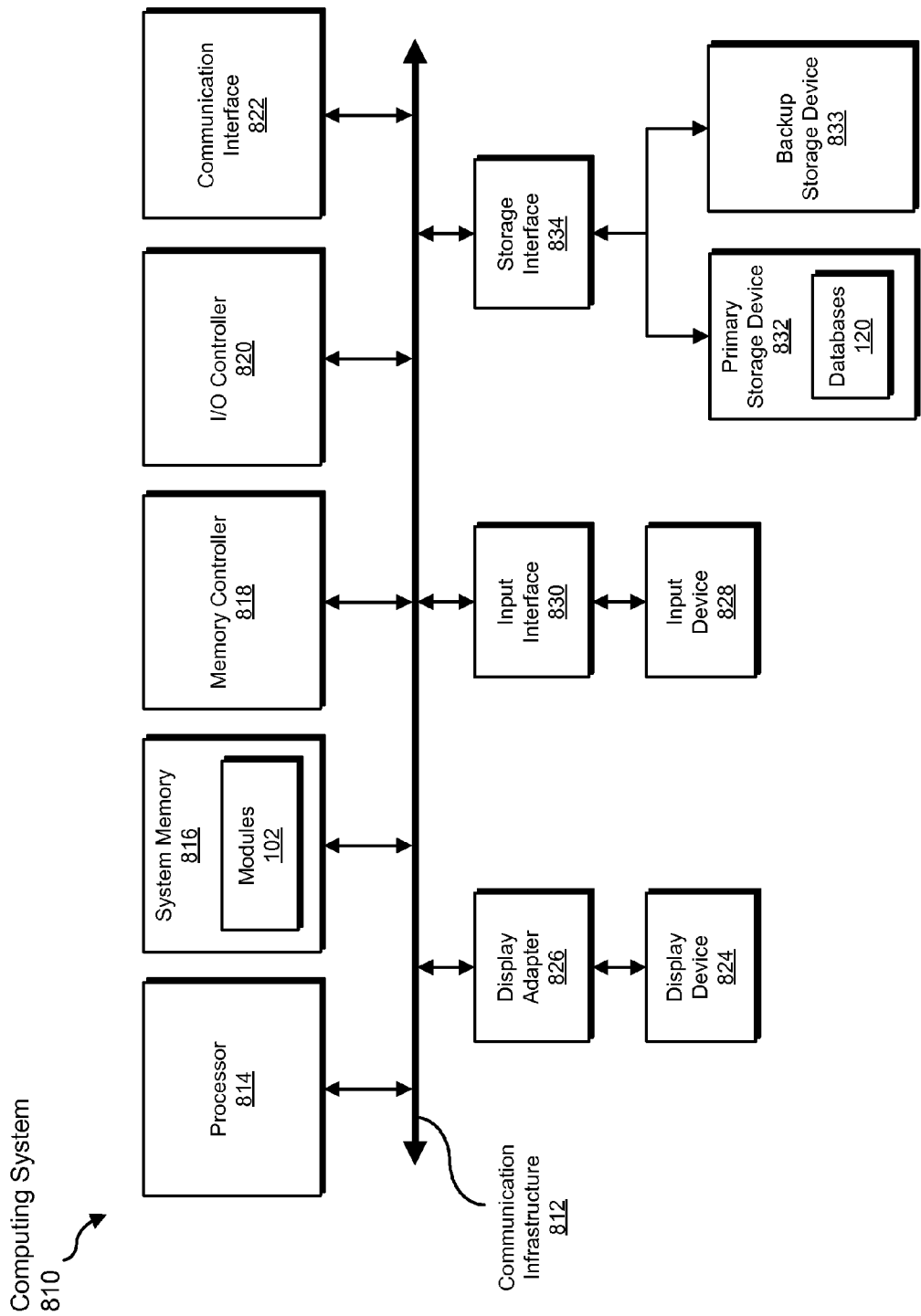
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, generating, determining, encrypting, querying, adding, transmitting, incrementing, retrieving, and/or decrypting steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an input/output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, generating, determining, encrypting, querying, adding, transmitting, incrementing, retrieving, and/or decrypting.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, generating, determining, encrypting, querying, adding, transmitting, incrementing, retrieving, and/or decrypting steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, generating, determining, encrypting, querying, adding, transmitting, incrementing, retrieving, and/or decrypting steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, generating, determining, encrypting, querying, adding, transmitting, incrementing, retrieving, and/or decrypting steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810. In one example, databases 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the identifying, generating, determining, encrypting, querying, adding, transmitting, incrementing, retrieving, and/or decrypting steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
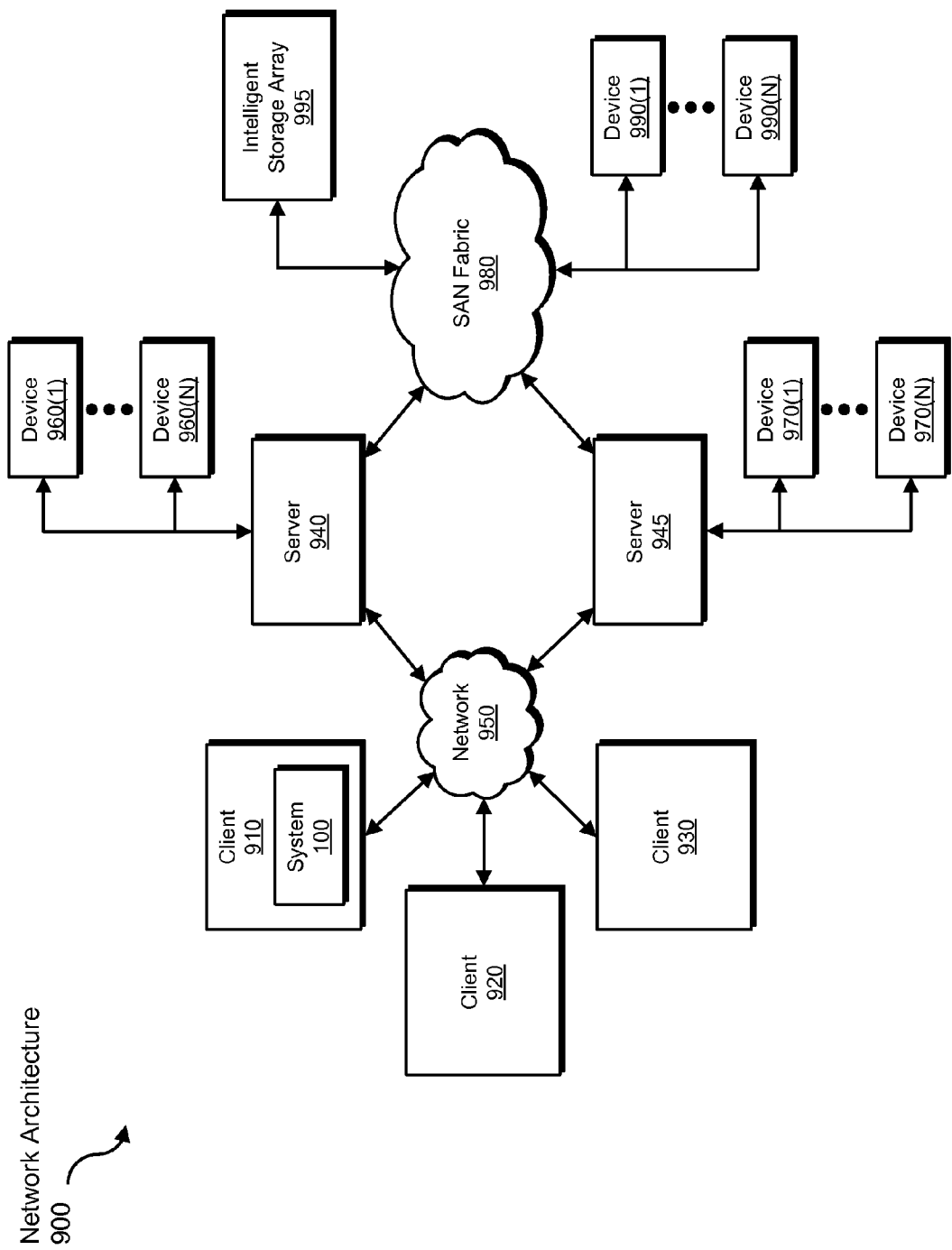
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. In one example, client system 910 may include system 100 from FIG. 1.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, generating, determining, encrypting, querying, adding, transmitting, incrementing, retrieving, and/or decrypting steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for securely deduplicating data owned by multiple entities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform data from multiple entities into securely deduplicated data. As another example, one or more of the modules described herein may transform a third-party storage system into a storage system for securely deduplicating data belonging to multiple entities.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for securely deduplicating data owned by multiple entities, at least a portion of the method being performed by a computing device comprising at least one processor, the method comprising:
    identifying a first data segment to store on a third-party storage system that provides storage for a plurality of clients;
    identifying a client-specific database maintained by the third-party storage system that contains fingerprints of deduplicated data segments stored on the third-party storage system by a client within the plurality of clients, wherein each fingerprint stored within the client-specific database is encrypted with a client-specific encryption key that is unique to the client;
    identifying a third-party database maintained by the third-party storage system that contains fingerprints of deduplicated data segments stored on the third-party storage system by the plurality of clients, wherein each fingerprint stored within the third-party database is encrypted with a third-party public encryption key that is different from the client-specific encryption key;
    generating a fingerprint based on the first data segment;
    determining, by generating a query using the client-specific encryption key, that the fingerprint is not identified in the client-specific fingerprint database;
    determining, by generating a query using the third-party public encryption key, that the fingerprint is not identified in the third-party fingerprint database;
    in response to determining that the fingerprint is not identified in both the client-specific fingerprint database and the third-party fingerprint database:
        encrypting the first data segment with the third-party public encryption key;
        transmitting the encrypted first data segment to the third-party storage system.

2. The method of claim 1, wherein determining, by generating the query using the client-specific encryption key, that the fingerprint is not identified in the client-specific fingerprint database comprises:
    encrypting the fingerprint with the client-specific encryption key;
    querying the client-specific fingerprint database with the client-specific-key encrypted fingerprint.

3. The method of claim 2, further comprising adding the client-specific-key encrypted fingerprint to the client-specific fingerprint database.

4. The method of claim 1, wherein determining, by generating the query using the third-party public encryption key, that the fingerprint is not identified in the third-party fingerprint database comprises:
    encrypting the fingerprint with the third-party public encryption key;
    querying the third-party fingerprint database with the third-party-key encrypted fingerprint.

5. The method of claim 4, further comprising adding the third-party-key encrypted fingerprint to the third-party fingerprint database.

6. The method of claim 1, further comprising:
    identifying a second data segment to store on the third-party storage system;
    generating a second fingerprint based on the second data segment;
    determining that the second fingerprint is not identified in the client-specific fingerprint database but is identified in the third-party fingerprint database;
    in response to determining that the second fingerprint is not identified in the client-specific fingerprint database but is identified in the third-party fingerprint database, incrementing a reference count for the second fingerprint within the third-party fingerprint database.

7. The method of claim 6, wherein determining that the second fingerprint is not identified in the client-specific fingerprint database comprises consulting a local cache that records the results of past queries to the client-specific fingerprint database.

8. The method of claim 1, further comprising:
    identifying a third data segment to store on the third-party storage system;

generating a third fingerprint based on the third data segment;
determining that the third fingerprint is identified in the client-specific fingerprint database;
in response to determining that the third fingerprint is identified in the client-specific fingerprint database, incrementing a reference count for the third fingerprint within the client-specific fingerprint database.

9. The method of claim 1, further comprising:
identifying a file that includes the first data segment;
identifying a client-specific metadata database for associating deduplicated data segments with files;
adding a reference linking the file to the first data segment to the client-specific metadata database.

10. The method of claim 1, further comprising:
identifying a fourth data segment to retrieve from the third-party storage system;
retrieving an encrypted fingerprint of the fourth data segment from the client-specific fingerprint database;
decrypting the encrypted fingerprint of the fourth data segment with the client-specific encryption key;
identifying the fingerprint of the fourth data segment within the third-party fingerprint database;
using the fingerprint of the fourth data segment to retrieve the fourth data segment from the third-party storage system;
wherein the third-party storage system decrypts the fourth data segment using a third-party private encryption key corresponding to the third-party public encryption key prior to providing the fourth data segment to the computing device.

11. The method of claim 10, wherein retrieving the fourth data segment comprises:
obtaining a session key;
receiving an encrypted version of the fourth data segment that has been encrypted using the session key;
decrypting the encrypted version of the fourth data segment using the session key.

12. The method of claim 1, wherein identifying the client-specific database comprises providing credentials required to access the client-specific database to the third-party storage system.

13. The method of claim 1, wherein generating the fingerprint comprises generating the fingerprint using a hash function that is identical to a hash function used by all other clients within the plurality of clients.

14. A system for securely deduplicating data owned by multiple entities, the system comprising:
at least one processor configured to execute:
an identification module that:
identifies a first data segment to store on a third-party storage system that provides storage for a plurality of clients;
identifies a client-specific database maintained by the third-party storage system that contains fingerprints of deduplicated data segments stored on the third-party storage system by a client within the plurality of clients, wherein each fingerprint stored within the client-specific database is encrypted with a client-specific encryption key that is unique to the client;
identifies a third-party database maintained by the third-party storage system that contains fingerprints of deduplicated data segments stored on the third-party storage system by the plurality of clients, wherein each fingerprint stored within the third-party database is encrypted with a third-party public encryption key that is different from the client-specific encryption key;
a generation module that generates a fingerprint based on the first data segment;
a determination module that:
determines, by generating a query using the client-specific encryption key, that the fingerprint is not identified in the client-specific fingerprint database;
determines, by generating a query using the third-party public encryption key, that the fingerprint is not identified in the third-party fingerprint database;
an encryption module and a transmission module that, in response to the determination that the fingerprint is not identified in both the client-specific fingerprint database and the third-party fingerprint database:
encrypt the first data segment with a third-party public encryption key;
transmit the encrypted first data segment to the third-party storage system.

15. The system of claim 14, wherein the determination module determines, by generating the query using the client-specific encryption key, that the fingerprint is not identified in the client-specific fingerprint database by:
encrypting the fingerprint with the client-specific encryption key;
querying the client-specific fingerprint database with the client-specific-key encrypted fingerprint.

16. The system of claim 15, wherein the determination module further adds the client-specific-key encrypted fingerprint to the client-specific fingerprint database.

17. The system of claim 14, wherein the determination module determines, by generating the query using the third-party public encryption key, that the fingerprint is not identified in the third-party fingerprint database by:
encrypting the fingerprint with the third-party public encryption key;
querying the third-party fingerprint database with the third-party-key encrypted fingerprint.

18. The system of claim 17, wherein the determination module further adds the third-party-key encrypted fingerprint to the third-party fingerprint database.

19. The system of claim 14, wherein:
the identification module further identifies a second data segment to store on the third-party storage system;
the generation module further generates a second fingerprint based on the second data segment;
the determination module further:
determines that the second fingerprint is not identified in the client-specific fingerprint database but is identified in the third-party fingerprint database;
in response to determining that the second fingerprint is not identified in the client-specific fingerprint database but is identified in the third-party fingerprint database, increments a reference count for the second fingerprint within the third-party fingerprint database.

20. A non-transitory computer-readable-storage medium comprising one or more computer-executable instructions that, when executed by at least one processor of a computing device, cause the computing device to:
identify a first data segment to store on a third-party storage system that provides storage for a plurality of clients;
identify a client-specific database maintained by the third-party storage system that contains fingerprints of deduplicated data segments stored on the third-party storage system by a client within the plurality of clients, wherein each fingerprint stored within the client-specific database is encrypted with a client-specific encryption key that is unique to the client;

identify a third-party database maintained by the third-party storage system that contains fingerprints of deduplicated data segments stored on the third-party storage system by the plurality of clients, wherein each fingerprint stored within the third-party database is encrypted with a third-party public encryption key that is different from the client-specific encryption key;

generate a fingerprint based on the first data segment;

determine, by generating a query using the client-specific encryption key, that the fingerprint is not identified in the client-specific fingerprint database;

determine, by generating a query using the third-party public encryption key, that the fingerprint is not identified in the third-party fingerprint database;

in response to determining that the fingerprint is not identified in both the client-specific fingerprint database and the third-party fingerprint database:
- encrypt the first data segment with the third-party public encryption key;
- transmit the encrypted first data segment to the third-party storage system.

\* \* \* \* \*